G. H. FRENCH.
GRAIN PICKLING DEVICE.
APPLICATION FILED JULY 17, 1914.
1,140,509.
Patented May 25, 1915.
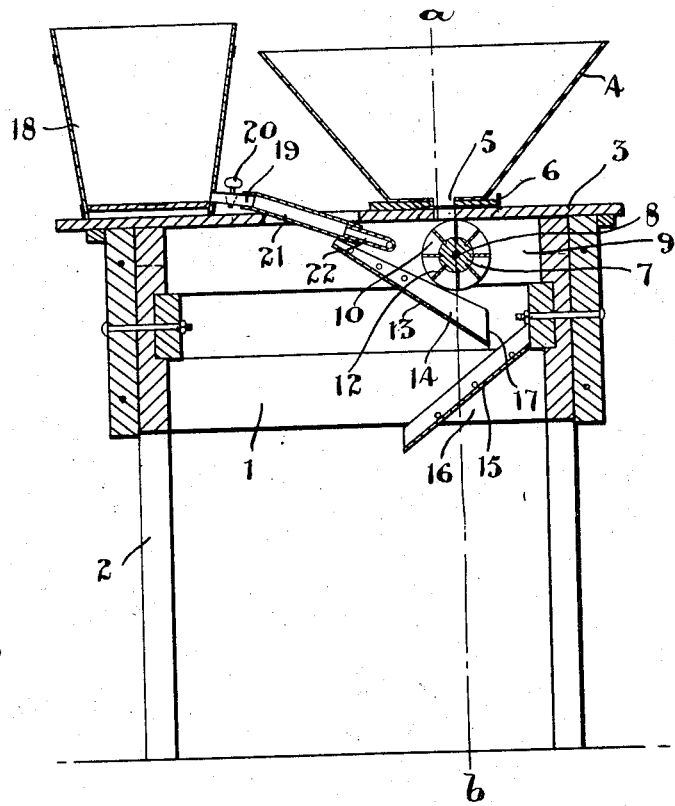
Fig. 1.
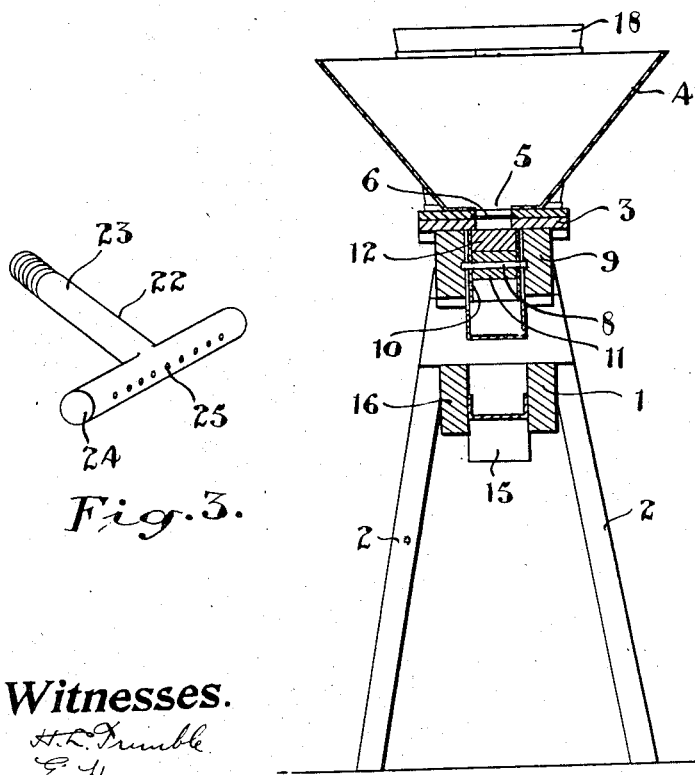
Fig. 2.
Fig. 3.
Witnesses.
H. L. Trimble
E. Heron
Inventor.
George H. French

UNITED STATES PATENT OFFICE.

GEORGE H. FRENCH, OF LAKE CENTRE, SASKATCHEWAN, CANADA.

GRAIN-PICKLING DEVICE.

1,140,509.  Specification of Letters Patent.  Patented May 25, 1915.

Application filed July 17, 1914. Serial No. 851,506.

*To all whom it may concern:*

Be it known that I, GEORGE H. FRENCH, a subject of the King of Great Britain, and resident of the village of Lake Centre, county of Humboldt, Province of Saskatchewan, in the Dominion of Canada, have invented certain new and useful Improvements in Grain-Pickling Devices, described in the following specification and illustrated in the accompanying drawings, that form part of the same.

The principal objects of the invention are, to effectively and thoroughly treat seed grain with a pickling solution which will disinfect the grain and kill all germs, and to devise a machine which will operate automatically and will thoroughly separate the grain in the presence of a disinfecting spray and which may be regulated to suit any desired class of grain or to effect a variation in the capacity of delivery.

A further object is to devise a machine of simple, cheap and durable construction which will not be liable to get out of order.

The principal feature of the invention consists in the novel construction and arrangement of parts, whereby the grains are delivered in a separated manner in the presence of a disinfectant or pickling solution by a rotary member arranged beneath the hopper and the grains are then caused to be effectively covered by the solution.

In the drawings, Figure 1 is a longitudinal vertical sectional view of a device constructed in accordance with this invention. Fig. 2 is a vertical cross sectional view of the device taken on the line *a—b* of Fig. 1. Fig. 3 is a perspective detail of the nozzle for spraying the disinfecting solution.

Like numerals of reference indicate corresponding parts in each figure.

Referring to the drawings, 1 is a rectangular shaped frame supported on suitable legs 2 having a top 3.

4 is a hopper supported on the top 3 adjacent to one end of the machine having a transverse slot 5 in the bottom thereof.

6 is a slide closing the slot 5, and adapted to be pulled outwardly to open the slot and allow the grain to fall therethrough.

7 is a rotatable drum journaled upon the pin 8 secured in the side members 9 of the frame. The drum 7 is formed with end flanges 10 projecting beyond the hub 11 and 12 are a plurality of radially arranged vanes extending between the end flanges and secured in said hub and forming a plurality of pockets adapted to receive the grain as it falls through the slot 5.

The axis of the drum is arranged about in alinement vertically with the forward edge of the slot 5 so that the grain will always fall into the pockets off center, thus causing the wheel to rotate upon its axis through the weight and impact of the grain.

13 is a chute or slide secured between the side members 9 of the frame and extending angularly downward toward the forward end of the machine, said chute having the side walls 14 extending upwardly to keep the grain from scattering beyond the chute.

15 is a chute arranged between the side members 16 of the frame and extending angularly downward from the open end 17 of the chute 13 directing the grain falling thereon downwardly and inwardly toward the center of the machine. This chute is open at the bottom to deliver the grain into any suitable receptacle which may be placed therebeneath.

18 is a tank of any suitable form located on the top 3 at the end opposite to the hopper having a pipe 19 leading from the bottom thereof provided with a valve 20 to regulate the flow of fluid therefrom.

21 is a flexible tube leading downwardly through the top 3 and connected with the pipe 19.

22 is a spray nozzle here shown in the form of a T the hollow shank 23 of which conducts the pickling fluid into the cross head 24. The cross head is provided with a plurality of perforations 25 in its forward edge or side.

The ends of the head 24 are preferably secured in the side members 9.

I have herein shown the desirable form of spray nozzle but it must be understood that other forms may be used if desired.

In the use of this device, the grain to be treated is placed within the hopper 4 and the tank 18 is filled with the pickling fluid. The valve 20 is then opened to give the desired flow of the fluid and the slide 6 is then opened to the desired distance to allow the grain to flow through the slot 5. As the grain falls downwardly it enters the pockets in the drum 7 and causes the said drum to rotate. The grains received in each pocket are discharged outwardly and downwardly into the spray from the nozzle 22 and falling on to the chute 13 they roll downwardly in the pickling fluid escaping from the nozzle and are discharged from the end of the said chute into the chute 15 and in the course of travel downward to the discharge end of the chute 15 the grains are thoroughly covered with the pickling fluid so that all the germs will be completely destroyed.

It will be noted that by operating the slide 6 and the valve 20 the discharge both of grain and fluid will be regulated to suit the requirements of various grains.

A device such as described is very simple in its construction and operation and operates automatically requiring no power to effect the scattering and distribution of the grain or for the gathering of same together to be finally discharged. The simplicity of operation and cheapness of this device allows of its universal use and will be a very great benefit in eliminating scourges of various kinds which attack all cereals.

What I claim as my invention is:—

1. A grain pickling device, comprising, a frame, a hopper supported on said frame, means for regulating the flow of grain from said hopper, an inclined trough shaped member arranged below the hopper, a horizontally rotatable member adapted to intercept the grain falling from the hopper and to discharge same intermittently upon the inclined surface of the trough, and means for directing a spray of pickling fluid upon said grain as it falls upon said trough.

2. A grain pickling device, comprising, a frame, a hopper supported on said frame, means for regulating the flow of grain from said hopper, a horizontally rotatable drum arranged below the discharge from said hopper and having pockets in the periphery adapted to receive the falling grain and to discharge same in separated quantities, an inclined trough shaped member arranged below said drum adapted to receive the grain discharged therefrom, a spray nozzle arranged above said chute adjacent to said drum, and a supply of pickling fluid connected to said spray nozzle.

3. A grain pickling device, comprising, a frame, a hopper supported on said frame, a horizontally rotatable member arranged below the discharge from said hopper adapted to intermittently scatter the grain, an inclined chute arranged below said scattering device open at the lower end, a spray nozzle arranged above said chute adjacent to said scattering device, a fluid supply connected with said spray nozzle, and an oppositely inclined chute spaced from and extending across the open lower end of the upper chute adapted to intercept and effect the further scattering and spraying of the grain.

4. A grain pickling device, comprising, a rectangular frame, a hopper supported at one end of said frame, an inclined trough arranged below said hopper, means arranged between the hopper and trough for scattering the grain, a spray nozzle extending completely across said trough adjacent to said scattering means, and a fluid supply connected with said spray nozzle.

Signed at town of Strassburg in the Province of Saskatchewan this twentieth day of April 1914.

GEO. H. FRENCH.

Witnesses:
LEMUEL A. SELLER,
ETHEL L. SELLER.